Sept. 12, 1972 TSUNEO OKADA ET AL 3,691,046

METHOD FOR MANUFACTURING A SUPERCONDUCTIVE COIL ELEMENT

Filed Sept. 25, 1969 3 Sheets-Sheet 3

United States Patent Office 3,691,046
Patented Sept. 12, 1972

3,691,046
METHOD FOR MANUFACTURING A SUPERCONDUCTIVE COIL ELEMENT

Tsuneo Okada, Chiba-ken, Yutaka Onodera, Takeshi Mitsuoka, Yukinori Saito, Yoshio Muto, and Takeshi Anayama, Sendai-shi, and Ko Yasukochi, Tokyo, Japan, assignors to Tokyo Shibaura Electric Co., Ltd., Kawasaki-shi, Japan Filed Sept. 25, 1969, Ser. No. 860,929
Claims priority, application Japan, Feb. 28, 1969, 44/15,520, 44/15,521, 44/15,522
Int. Cl. C23c *15/00*
U.S. Cl. 204—192 1 Claim

ABSTRACT OF THE DISCLOSURE

A superconductive coil element comprising a layer of superconductive material and a layer of insulating material, each alternately arranged in a helical form centered about a common axis with their adjacent turns tightly attached to each other. The superconductive coil element exhibits a maximum critical current density when an electromagnetic field acting on the surface of said superconductive layer is substantially at an angle of 90°. The method of manufacture comprises relatively disposing the substrate and evaporation sources which respectively consists of said superconductive material and insulating material with the adjacent planes of the substrate and evaporation sources facing each other, interposing a perforated shield between the substrate and the sources, rotating the substrate and evaporation sources relative to each other and evaporating the superconductive material and insulating material at the same time separately from each other to successively deposit same on an annular region of the substrate.

FIELD OF THE INVENTION

The present invention relates to a method for manufacturing a superconductive coil element employed in generating a strong electromagnetic field at extremely low temperatures approaching the absolute zero point. Such a coil element is recognized to be useful for magnetohydrodynamics power generation, nuclear fusion or special electrical apparatus.

BACKGROUND OF THE INVENTION

A superconductive coil element is generally prepared by embedding a wire of superconductive material in a coiled form in a metal of high thermal conductivity such as copper, or winding a ribbon or strip (generally formed on the surface of a strip-like support of stainless steel) of superconductive material in a coiled form. One of the drawbacks encountered with these known methods is that due to various restrictions imposed on the manufacturing process, it is impossible to increase the proportions of a ribbon or strip of superconductive material beyond a certain limit with respect to the given length in the axial direction of the coil element, namely, that increased helical forms would unavoidably lead to the prominent extension of said length with the resultant occurrence of much inconvenience. Therefore, the number of coil turns allowed within said prescribed length has naturally been subject to restriction. Another and more significant disadvantage of the aforementioned known methods is that the embedding of a coiled form of superconductive material in a copper mass or the winding of a ribbon of superconductive material together with that of insulating material requires complicated work and the operation efficiency is too low to be adapted for the commercial production of a coil element.

SUMMARY OF THE INVENTION

According to the present invention there is provided a superconductive coil element comprising a helical layer of superconductive material of NaCl crystal structure and a helical layer of insulating material interposed between the layers of the superconductive material, each material being alternately deposited by means of sputtering, said superconductive coil element exhibiting a maximum critical current density when an electromagnetic field acting on the surface of said superconductive layer is substantially at an angle of 90°. The superconductive coil element can be produced by a method which comprises depositing a helical form of superconductive material on a circular substrate. Such deposition is effected by fully covering the substrate with a shield perforated with through holes having a shape corresponding to a portion of the annular region of the substrate and ejecting the evaporated superconductive material all over said annular region successively while rotating the substrate about the center of said region. Along with the deposition of the superconductive material, there is also deposited insulating material by sputtering the evaporated portion thereof on to the substrate from separate through holes (preferably having a shape corresponding to a portion of the annular region of the substrate). The simultaneous rotation of the substrate produces a coil element consisting of a helical layer of said superconductive material having the same number of turns as the number of substrate rotations and a similar helical layer of insulating material interposed between the adjacent turns of the superconductive material layer. The layer of each of the superconductive and insulating materials can be adjusted in thickness by varying the rate at which the evaporated material is evolved out of the source, the speed of the relative rotation of the source and substrate and the peripheral length of the through hole formed in the shield.

Evaporation from the source may be made by either ordinary vacuum deposition techniques or sputtering using the later described unsymmetrical alternating current or both. For the reason given below, however, it is recommended to use said sputtering process involving unsymmetrical alternating current. This vacuum deposition method enables a coil element to be manufactured by a far more simplified process and with more excellent properties than the prior art.

The term "insulating material" as used in this specification denotes that which does not display the property of superconductivity under the condition in which the superconductive material used exhibits such property. Accordingly, the term "insulating material" includes not only ordinary insulating material such as glass, silica, alumina or fused quartz, but also copper or gold which is normally accepted as a conductor.

DETAILED DESCRIPTION OF THE INVENTION

Figures 1, 2:
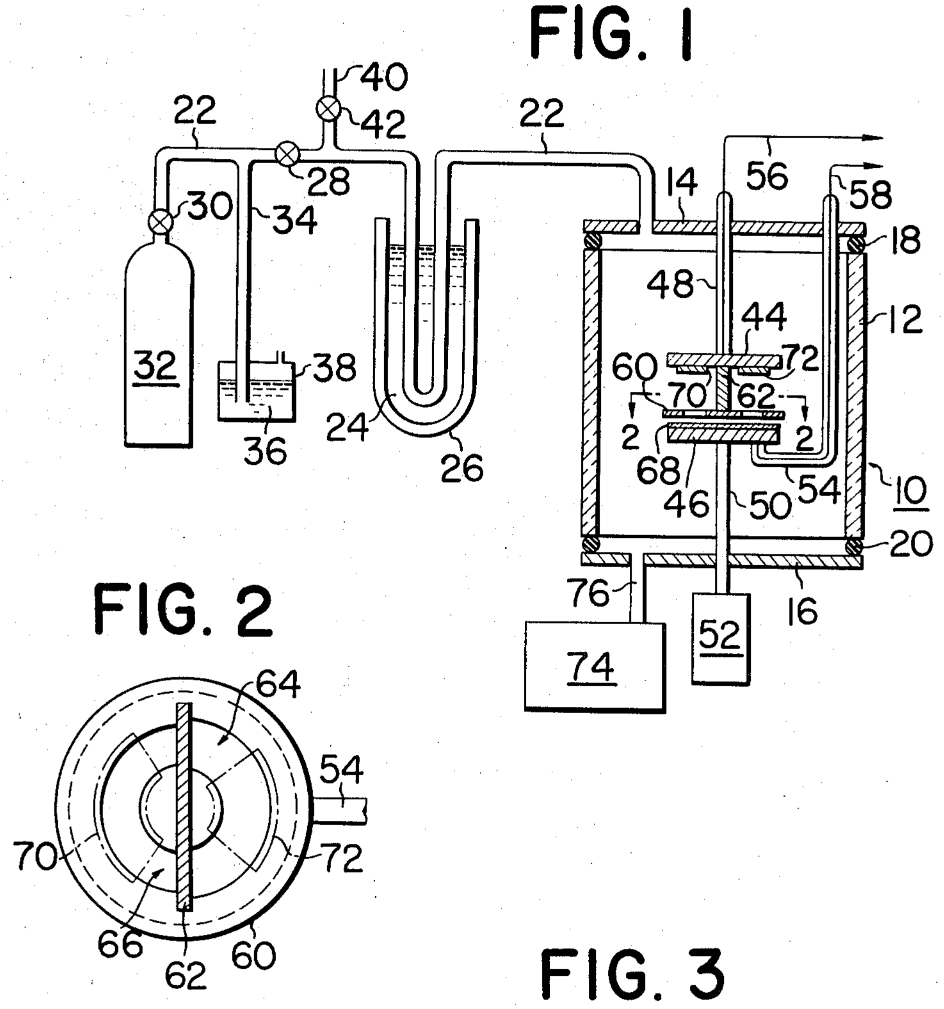
FIG. 1 is a schematic longitudinal section of an apparatus adapted to manufacture a superconductive coil element.
FIG. 2 is an enlarged section on line 2—2 in FIG. 1.

FIG. 1 shows an apparatus adapted to manufacture a superconductive coil element according to the present invention. Numeral 10 generally denotes a vessel having a cylindrical glass member 12, and an upper plate 14 and lower plate 16 disposed at both ends of said cylindrical member 12 respectively. The upper and lower plates 14 and 16 are sealed airtight to the cyindrical member 12 by packings 18 and 20 respectively interposed therebetween. One end of a pipe 22 opens to the interior of the vessel 10 through the upper plate 14, and the other end reaches a cylinder 32 after travelling downward and upward through a liquefied gas 24 received in a vessel 26 and then through valves 28 and 30 such as needle valves, thus allowing inert gas such as argon contained in said cylinder 32 to be introduced into the vessel 10. At a point upstream of the valve 28, there is connected one end of a pipe 34 to the pipe 22. The other end of the pipe 34 opens below the level of the mercury 36 held in a tank 38 so as to serve as mercury buffer. At a point downstream of the valve 28 there is connected a pipe 40 provided with a valve 42. This pipe 40 communicates with a feed mechanism (not shown) of reaction gas such as nitrogen gas. Proper operation of the valves 28 and 42 allows inert gas such as argon and reaction gas such as nitrogen to be respectively introduced into the vessel 10 through the pipe 22 at a desired flow rate.

In the vessel 10 are arranged a pair of electrodes 44 and 46 possibly assuming a disc form in a manner to face each other. The upper electrode 44 is supported by a shield tube 48 made of fused quartz which is fixed to the upper plate 14 in a manner to penetrate it. The lower electrode 46 is fixed to the upper end of the shaft 50 of a motor 52 which extends into the vessel 10 through the lower plate 16. To the underside of the lower electrode 46 is connected one end of another shield tube 54 which extends into the vessel 10 through the upper plate 14. Lead wires 56 and 58 respectively run through the shield tubes 48 and 54 and are connected to the electrodes 44 and 46. These lead wires 56 and 58 are also connected to a source (not shown) for supplying unsymmetrical alternating current or half wave rectified current.

Under the upper electrode 44 is supported a shield 60 by means of a partition board 62 in a parallel plane with the lower electrode 46 in the close proximity thereof. The partition board 62 has a sufficient width to divide the upper electrode 44 into two half-circles. As clearly seen from FIG. 2, the shield 60 has two through holes 64 and 66 so shaped as to form a segment of the annular region of said shield 60. One, for example, 66 of said holes has a slightly smaller width than the other 64. A substrate 68 made of, for example, glass on which a superconductive coil is to be formed is fixed to the upper surface of the lower electrode 46. An evaporation source 70 of material to form the superconductive component of said coil element, for example, a niobium plate, and an evaporation source 72 of material to form the insulating component of said coil element, for example, a copper plate are fixed by suitable means to the underside of the upper electrode 44 with the the partition board 62 disposed therebetween. As indicated by the broken lines of FIG. 2, the niobium plate 70 and copper plate 72 respectively assume forms corresponding to the aforesaid segments of the annular region of the shield 60, the copper plate 72 having a slightly larger width than the niobium plate 70.

Numeral 74 denotes evacuating means preferably provided with a nitrogen trap, which communicates with the interior of the vessel 10 through a pipe 76 penetrating the lower plate 16 so as to draw gas out of the vessel 10.

Prior to vapor deposition, the vessel 10 is evacuated by evacuating means 74, and then argon gas from the cylinder 32 and nitrogen gas through the pipe 40 by feed means (not shown) are introduced into the vessel 10 through the pipe 40. The gas pressure in the vessel 10 is controlled by properly adjusting the ratio which the flow rate of mixed gases introduced through the pipe 22 into the vessel 10 bears to the flow rate of gases discharged therefrom by the evacuating means 74. Then the motor 52 is driven to cause the lower electrode to rotate at a slow speed, for example, at the rate of 0.01 to 0.1 r.p.m., thereby accomplishing the relative rotation of the upper and lower electrodes 44 and 46.

While the lower electrode is being rotated, there is impressed across both electrodes 44 and 46 through the lead wires 56 and 58 a voltage of half wave rectified current or unsymmetrical alternating current so as to allow sputtering current to flow from the lower electrode 46 to the upper electrode 44.

Figure 3:
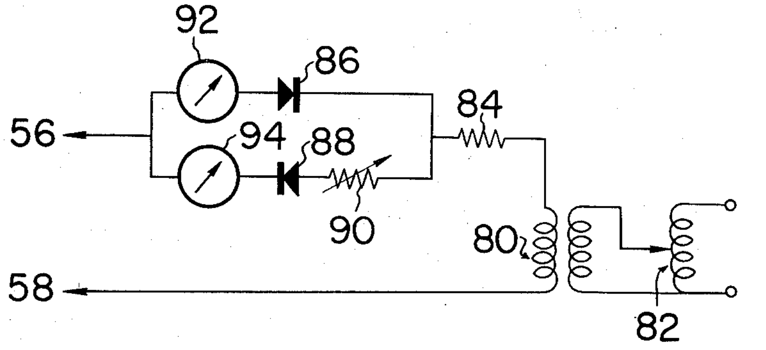
FIG. 3 illustrates an electrical circuit used in impressing a voltage of unsymmetrical alternating current across the electrodes of the apparatus illustrated in FIG. 1.

FIG. 3 illustrates a source circuit for impressing a voltage of unsymmetrical alternating current across the electrodes 44 and 46. This circuit has a transformer 80, the primary winding of which is connected through a suitable voltage regulator 82 to a A.C. source, for example, a commercial A.C. source of 100 v., 50 c./s. One end of the secondary winding of the transformer 80 is connected to the lead wire 58 (FIG. 1), and the other end to one end of a resistor 84. The other end of said resistor 84 is connected to the lead wire 56 (FIG. 1) through a pair of diodes 86 and 88 arranged in inverse parallel. Between the resistor 84 and diode 88 is interposed a variable resistor 90. Preferably between the diode 86 and the lead wire 56 and also between the diode 88 and said lead wire 56 are disposed ammeters 92 and 94 respectively. Where there is interposed the circuit of FIG. 3 between the A.C. source and each of the lead wires 56 and 58, there flows through the lead wires 56 and 58 unsymmetrical alternating current wherein the wave height on the negative side of current is lower than that on the positive side, according to the magnitude of resistance offered by the variable resistor 90 disposed between the diode 88 and resistor 84.

If the voltage impressed across the electrodes 44 and 46 is larger than a discharge voltage, then there appear discharges across them. Said discharge sputters the niobium plate 70 and copper plate 72 to evaporate these materials. The evaporated portions of said plates 70 and 72 are carried to the upper surface of the substrate 68 through the holes 66 and 64 to be coagulated thereon. The vapor of copper evolved from the copper plate 72 is brought through the hole 64 to the upper surface of the substrate 68, while the vapor of niobium released from the niobium plate 70 reacts with nitrogen gas included in the atmosphere of the vessel to form niobium nitride, said nitride being also conducted to the upper surface of the substrate 68. Due to the provision of the partition board 62, however, these evaporated materials do not mix with each other. At the time of vapor deposition, the substrate 68 is rotating with respect to the shield 60, so that a layer of niobium nitride is helically formed on the substrate 68 and there is similarly deposited thereon a layer of copper, these helical formations being superposed on each other by turns. The shield hole 64 allowing the passage of copper vapor is slightly wider than that 66 for the vapor of niobium nitride, so that the surface of the niobium nitride ribbon is fully covered with a copper layer.

In the foregoing embodiment, there is used a niobium plate as an evaporation source so as to allow the vapor of niobium evolved from said plate to react with the nitrogen gas included in the atmosphere of the vessel thereby forming a superconductive material of niobium nitride on the substrate. Obviously, the evaporation source may also consist of niobium nitride. This applies with other superconductive materials than niobium nitride, for example, titanium nitride. With respect to niobium carbide which may also be employed as such a superconductive material, carbon compounds as a source of carbon, for example, carbon monoxide or hydrocarbons such as $CH_4$ is used as a component of the atmosphere of the vessel.

Figure 4:
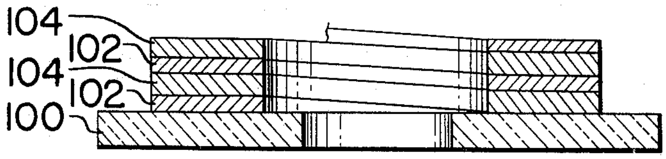
FIG. 4 is a longitudinal sectional view of a superconductive coil element according to an embodiment of the invention.
Figure 5:
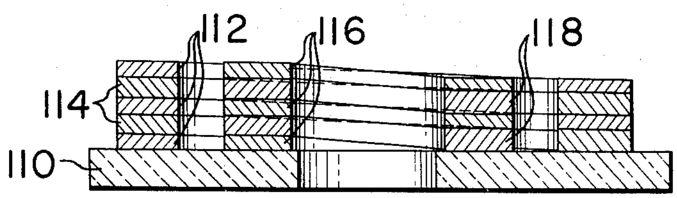
FIGS. 5 and 6 respectively show superconductive coil elements according to other embodiments of the invention.
Figure 6:
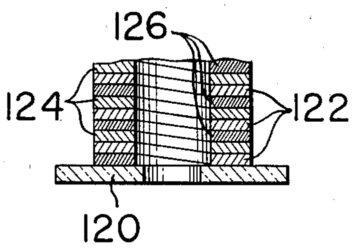

There is illustrated in FIG. 4 a typical superconductive coil element prepared by the aforementioned process. This coil element consists of a glass substrate 100, and alternately superposed layers of superconductive material 102 and insulating material 104 vapor deposited on said substrate 100. FIG. 5 illustrates another type of superconductive coil element prepared by alternately vapor depositing helically formed layers of superconductive material 112 and insulating material 114 on the first annular region of one side of a single substrate 110 and a separate group of helically formed layers of superconductive material 116 and insulating material 118 on the second annular region of the same side of said single substrate 110, said second annular region being concentric with, and having a smaller diameter than, the first annular region. With such type of coil element, both superconductive material and insulating material may also be vapor deposited at once by the same process as described above, using a shield perforated with two circular rows of through holes concentrically arranged with each other. FIG. 6 shows still another type of superconductive coil element prepared by vapor depositing on one side of a substrate 120 groups of three helically formed layers, namely, a layer 122 of superconductive material, a first layer 124 of insulating material e.g. Cu, Ag or Au, and a second layer 126 thereof. This type of coil element can be fabricated by vapor depositing on the substrate 120 three kinds of evaporation materials through the holes formed in the annular region of the shield, using an evaporation source divided into three separate compartments by partition boards.

Figure 7:
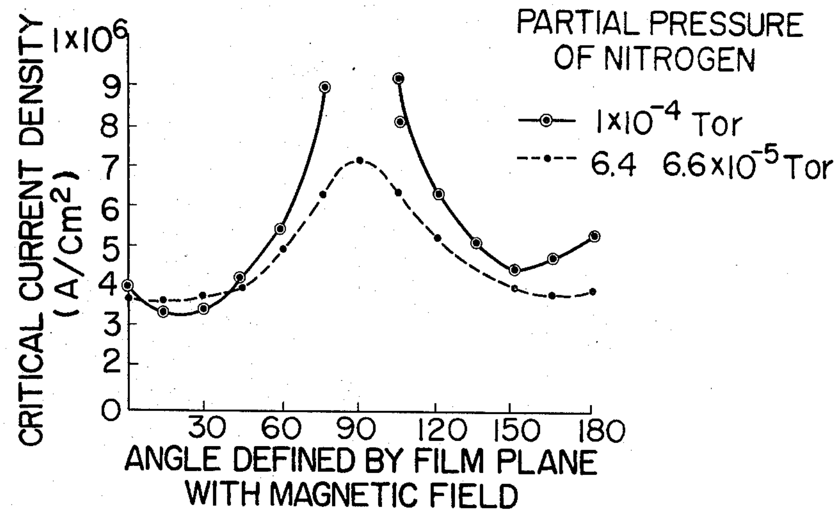
FIG. 7 is a graph showing the relationship between the direction of an electromagnetic field and critical current density in the superconductive coil element of the invention.

The layer of superconductive material vapor deposited by the aforesaid process has the property of angle dependency, namely, that its critical current density varies with the direction in which there is applied an electromagnetic field thereon. When the electromagnetic field acts on said layer in a substantially perpendicular direction to its surface it displays a maximum critical current density. This angle dependency most prominently appears when the superconductive layer consists of materials having a crystal structure like that of sodium chloride, for example, niobium nitride, niobium carbide, or mixture of niobium nitride and/or niobium carbide and titanium nitride and/or titanium carbide, while said angle dependency somewhat varies with the conditions in which there is formed a superconductive material, the basic tendency is common to all such materials. There is presented in FIG. 7 the angle dependency of two types of superconductive niobium nitride prepared by evaporating niobium in the atmosphere consisting of a gaseous mixture of argon and nitrogen. As is apparent from FIG. 7, while the partial pressure of nitrogen gas causes slight variations in the absolute value of a critical current density, an electromagnetic field acting on the surface of said superconductive layer substantially at an angle of 90° thereto allows it to exhibit a maximum critical current density.

Where there is formed by sputtering a ribbon of superconductive material using unsymmetrical alternating current, said ribbon displays a higher superconductive transition temperature than that prepared by direct current sputtering. It has been discovered that there is obtained a superconductive ribbon having the highest superconductive transition temperature if the ratio which the value of the normal component of unsymmetrical alternating current bears to the opposite component falls within a certain range.

Figure 8:
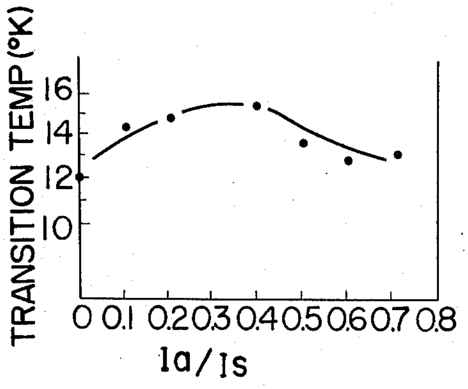
FIG. 8 is a graph showing the relationship of the critical temperature applied to the superconductive coil element of the invention versus the ratio of the normal to the opposite component of the unsymmetrical alternating current.

There is indicated in FIG. 8 the superconductive transition temperature of several layers of superconductive niobium nitride prepared using diverse types of unsymmetrical alternating current in which the normal component $Is$ bears different ratios $Ia/Is$ to the opposite component $Ia$. These layers of superconductive material were formed on a glass substrate by the aforementioned process using the same apparatus as shown in FIGS. 1 and 2 provided with a source of unsymmetrical alternating current formed of a circuit arrangement as shown in FIG. 3. During sputtering, the pressure of the atmosphere of the vessel 10 was maintained at $1\times10^{-4}$ mm. Hg, and the partial pressure of nitrogen gas at $3\times10^{-2}$ mm. Hg. The normal current density $Is$ of the upper electrode 44 was kept at 0.42 ma./cm.$^2$ and the opposite current density $Ia$ was varied by adjusting a variable resistor 90 (FIG. 3).

As is apparent from FIG. 8, when the value of the ratio $Ia/Is$ exceeds 0.1, the superconductive transition temperature rises and attains a maximum value at the ratio of 0.3 to 0.4 and beyond 0.4 again decreases. This suggests that where there is to be produced a superconductive material having a higher superconductive transistion temperature, it is preferred to choose the ratio of $Ia/Is$ within a range of 0.1 to 0.6.

While it is not fully defined how sputtering by unsymmetrical alternating current allows the resultant superconductive material to have a higher superconductive transition temperature, the impingement of gas ion by the opposite component of said unsymmetrical alternating current on the superconductive material formed is supposed to have some action associated with the aforesaid characteristic. The main function of gas ion impingement is to urge gases occluded in a superconductive material during its formation to be expelled and also to allow said material to have a composition approaching a stoichiometrical one.

The foregoing description relates to the case where current was used as a stimulant for an evaporation source. It will be apparent, however, that application of thermal evaporation will similarly permit the formation of a superconductive coil element. In either case, it is possible easily to prepare a superconductive coil element, so long as said preparation is made according to the present invention which is characterized by using a plurality of evaporation sources, disposing a substrate in a manner to face said sources, interposing between said substrate and sources a shield perforated with through holes having a shape corresponding to a portion of the annular region of the shield and the same number as said evaporation sources, and allowing evaporation materials to be evolved at the same time from the source while the substrate and sources are relatively rotated.

The important advantages of the present invention are that the thickness of superconductive and insulating layers formed on a substrate can be adjusted over a broad range by varying the speed of relative rotation of the evaporation sources and substrate and that the ratio which the thickness of the superconductive layer bears to that of the insulating layer can be chosen with a certain degree of freedom by varying the peripheral length of one of the holes formed in the shield in comparison with that of the other. This means that there can be prepared a superconductive coil element wherein the superconductive material occupies a much broader area in the axial direction of said coil element. Such type of coil element will allow a strong electromagnetic field to be generated due to the absence of a gap between the superposed superconductive and insulating layers.

What we claim is:

1. A method for manufacturing a superconductive coil element said coil element exhibiting a maximum critical current density when an electromagnetic field acting on the surface of said superconductive layer is substantially at an angle of 90° with respect to said surface of said superconductive layer having a first layer of superconductive material and a second layer of insulating material which does not display superconductivity under the condition in which said superconductive material exhibits superconductivity, said first and second layers having a helical form centered about a common axis, and being jointly supported on a substrate and their adjacent turns being tightly attached to each other, said method comprising:

(a) disposing deposition sources comprised of materials for forming said first and second layers respectively in a manner to face said substrate;

(b) interposing a shield between said deposition sources and substrate, said shield having a plurality of through holes, each hole having a shape corresponding to a portion of the annular region of said shield, a hole through which the superconductive material is passed being slightly smaller in width than that through which the insulating material is passed;

(c) rotating said sources and substrate relative to each others;

(d) simultaneously causing said deposition materials to sputter from said sources by unsymmetrical alternating current sputtering with the ratio of the normal component $I_s$ and the opposite component $I_a$ (i.e. $I_a/I_s$) falling within a range of 0.1 to 0.6; and (e) conducting the sputtered materials to the surface of said substrate with one of said materials passing through one of said holes of said shield and the other material flowing through another of said holes of said shield, thus depositing helical layers of superconductive material and insulating material, with the insulating material interposed between layers of the superconductive material.

References Cited

UNITED STATES PATENTS

| | | | |
|---|---|---|---|
| 3,205,413 | 9/1965 | Anderson | 117—217 |
| 3,483,114 | 12/1969 | Sapoff et al. | 204—192 |
| 2,886,502 | 5/1959 | Holland | 204—192 |
| 3,449,092 | 6/1969 | Hammond | 117—217 |
| 3,494,853 | 2/1970 | Anderson et al. | 204—298 |
| 3,528,906 | 9/1970 | Cash et al. | 204—298 |

OTHER REFERENCES

Vratny et al., "Tantalum Films Deposited by Asymmetry A–6 Sputtering," J. of Electrochemical Soc., 484–489, May 1965.

JOHN H. MACK, Primary Examiner

S. S. KANTER, Assistant Examiner

U.S. Cl. X.R.

117—217